United States Patent
Iguchi (10) Patent No.: US 6,695,273 B2
(45) Date of Patent: Feb. 24, 2004

(54) SELF-STANDING KEYBOARD SUPPORT AND KEYBOARD WITH SAID SUPPORT

(75) Inventor: Issei Iguchi, Tokyo (JP)

(73) Assignee: Iguchi Issei Co., Ltd., Tokyo (JP)

( * ) Notice: Subject to any disclaimer, the term of this patent is extended or adjusted under 35 U.S.C. 154(b) by 0 days.

(21) Appl. No.: 10/195,467

(22) Filed: Jul. 16, 2002

(65) Prior Publication Data

US 2004/0011937 A1 Jan. 22, 2004

(51) Int. Cl.⁷ .................................................. A47G 1/24
(52) U.S. Cl. ...................... 248/351; 248/455; 248/459; 248/918
(58) Field of Search ................................ 248/300, 351, 248/454, 455, 457, 456, 459, 465, 460, 462, 463, 918; 52/127.2

(56) References Cited

U.S. PATENT DOCUMENTS

| | | | | |
|---|---|---|---|---|
| 1,079,033 A | * | 11/1913 | Steinhoff | 248/454 |
| 2,373,617 A | * | 4/1945 | Tiryakian | 248/453 |
| 2,975,905 A | * | 3/1961 | Foland | 211/50 |
| 3,381,928 A | * | 5/1968 | White | 248/455 |
| 3,410,516 A | * | 11/1968 | Criswell | 248/459 |
| 3,738,604 A | * | 6/1973 | Howlett et al. | 248/459 |
| 4,901,969 A | * | 2/1990 | Yaeger | 248/455 |
| 5,253,840 A | * | 10/1993 | Sheremetta | 248/452 |
| 6,196,512 B1 | * | 3/2001 | Ure | 248/464 |
| 6,508,451 B1 | * | 1/2003 | Blythe et al. | 248/688 |

* cited by examiner

Primary Examiner—Ramon O. Ramirez
Assistant Examiner—Jon Szumny
(74) Attorney, Agent, or Firm—Finnegan, Henderson, Farabow, Garrett, & Dunner LLP (57) ABSTRACT

A self-standing keyboard support having two L-shaped bands each consisting of a flat band portion and an edge portion extending from one side thereof at an approximately right angle to the respective flat band portion, with the flat band portions preferably differing in length. The edge portions of the two L-shaped bands are arranged in such a way that the respective outer sides thereof face each other. A thin resilient strip is placed across sides of the two flat bands portions opposite from the sides from which the edge portions extend and underneath the edge portions to join the two L-shaped bands together. Further an adhesive portion can be provided on the rear side of the thin resilient strip, thereby enabling its installation on a keyboard.

8 Claims, 7 Drawing Sheets

Part C in detail

SELF-STANDING KEYBOARD SUPPORT AND KEYBOARD WITH SAID SUPPORT

BACKGROUND OF THE INVENTION

1. Field of the Invention

The present invention relates to a self-standing keyboard support, which holds self-standing a keyboard which is an input device for a computer, and a keyboard equipped with said self standing support.

A keyboard, which is an input device for a personal computer or the like, is commonly placed, and used, on a desk, a side table, or a personal computer rack. However, even when a keyboard is not in use, it still occupies a certain space on the desk. This limits the workspace for an office worker, a problem of an ineffective use of the workspace. In other words, a keyboard not in use is not functional but stands in the way of office work.

2. Description of the Background Art

Attempts have been made to overcome this problem by holding the keyboard upright to open up the workspace on the desk. Japanese Patent Laid-Open Publication No. 2000-66813 discloses a self standing keyboard support which is provided, on the back of the keyboard, with a mounting portion which fits the back thereof said portion having a self-standing keyboard support built therein, and said self-standing keyboard support enabling the keyboard to stand upright.

However, this self-standing keyboard support, which is fitted into the back of the keyboard and is indented extensively as if it were to bore the keyboard, makes it inconvenient to operate the keyboard with said self-standing support attached thereto. Since said self-standing support is directed toward where the keyboard user's hands rest, it is unsightly and a distraction to work.

SUMMARY OF THE INVENTION

It is an object of this invention to provide a self-standing keyboard support which can be easily attached to a keyboard, and a keyboard equipped with said self-standing support. It is another object of this invention to provide a self-standing keyboard support that enables one to operate the keyboard freely with no interference while the keyboard is fitted with the self-standing support, and a keyboard equipped with said self-standing support.

That is, the present invention relates to a self-standing keyboard support comprising:

an L-shaped band (9) and an L-shaped band (8) wherein said L-shaped band (9) consisting of a flat band portion (4), which is a flat band shaped member, and an edge portion (3) which is formed at one end thereof at an angle to said flat band portion (4) and said L-shaped band (8) consisting of a flat band portion (7) and an edge portion (2) which is formed at one end thereof at an angle to said flat band portion (7) are arranged in such a way that the edge portion (3) faces the edge portion (2) with a designated distance apart therebetween;

the flat band portion (4) and the flat band portion (7) are joined together via a thin resilient strip (6) placed across the undersides of the edge portions (3) and (2).

The flat band portion (7) may be made longer than the flat band portion (4); the backside of the flat band portion (4) may be further provided with an adhesive portion (5). It is preferred for the flat band portion (7) to be 2.5–4.5 times as long as the flat band portion (4). In addition, the edge portion (2) may be made shorter than the edge portion (3), and the space between the edge portions (2) and (3) is preferably 0.17–0.65 times the exterior side length of the edge portion (2).

In a keyboard equipped with the above self-standing keyboard support, the L-shaped band (18) consisting of a flat band portion (13) and an edge portion (17) which is formed at one end thereof at an angle to the flat band portion (13) is joined to one side of a thin resilient strip (12) while the other side of said thin resilient strip (12) is secured embedded into the keyboard back portion (11); said embedded portion is provided with a protruding portion (14), and the end face of said protruding portion (14) and said edge portion (17) are arranged to face each other with a designated distance apart therebetween. The height of the protruding portion (14) preferably is equal to the height of the edge portion (17) minus the thickness of the flat band portion (13). In the keyboard equipped with the self-standing support, an indented portion (15) which is as deep as the sum of the thickness of the thin resilient strip (12) and the thickness of the flat band portion (13), is as wide as that of the flat band portion (13), and is as long as the sum of the distance from the L-shaped band (18) to the end face of the protruding portion (14) and the length of the flat band portion is formed on the backside portion of the keyboard (11). The space between the edge portion (17) and the end face of the protruding portion (14) is preferably 0.17–0.65 times the exterior side length of the edge portion (17). The angles formed by the flat band portion (4) and the edge portion (3), the flat band portion (7) and the edge portion (2), and the flat band portion (13) and the edge portion (17) are right angle, respectively.

BRIEF DESCRIPTION OF THE DRAWINGS

FIGS. 1(*a*) and (*b*) illustrate a keyboard support of the present invention.

FIGS. 2(*a*) and (*b*) illustrate the way the flat band portion of the self-standing support is open.

FIGS. 5(*a*), (*b*), and (*c*) illustrate a keyboard equipped with another self-standing support of this invention.

FIGS. 6(*a*) and (*b*) illustrate the way the flat band portion of a keyboard equipped with a self-standing support is opened.

DETAILED DESCRIPTION OF THE PREFERRED EMBODIMENTS

Figure 1:
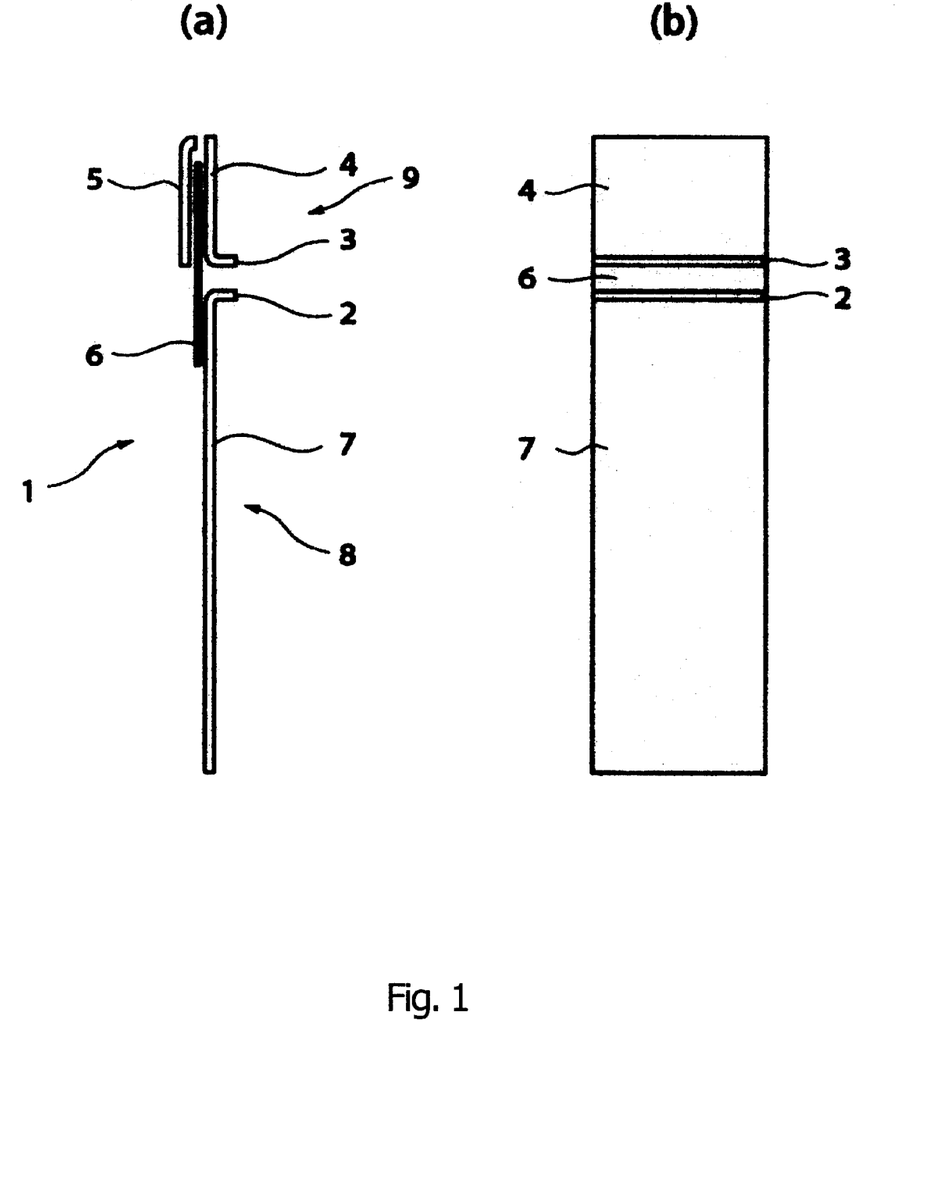

The embodiment of this invention is explained with reference to the attached drawings. FIG. 1 illustrates a self standing keyboard support 1 of this invention FIG. 1(*a*) is a side view and the FIG. 1(*b*) is a frontal view. The self-standing keyboard support 1 is formed by having an L-shaped band 9 consisting of a flat band portion 4 and an edge portion 3 which is formed at one end thereof at an approximately right angle to the band portion 4 and an L-shaped band 8 consisting of a flat band portion 7 and an edge portion 2 which is formed at one end thereof approximately at a right angle to said flat band portion 7 arranged in such a way that the edge portion 3 faces the edge portion 2 with a designated distance apart therebetween and having the flat band portion 4 and the flat band portion 7 joined together via a thin resilient strip 6 placed across the undersides of the edge portions 3 and 2.

Figure 3:
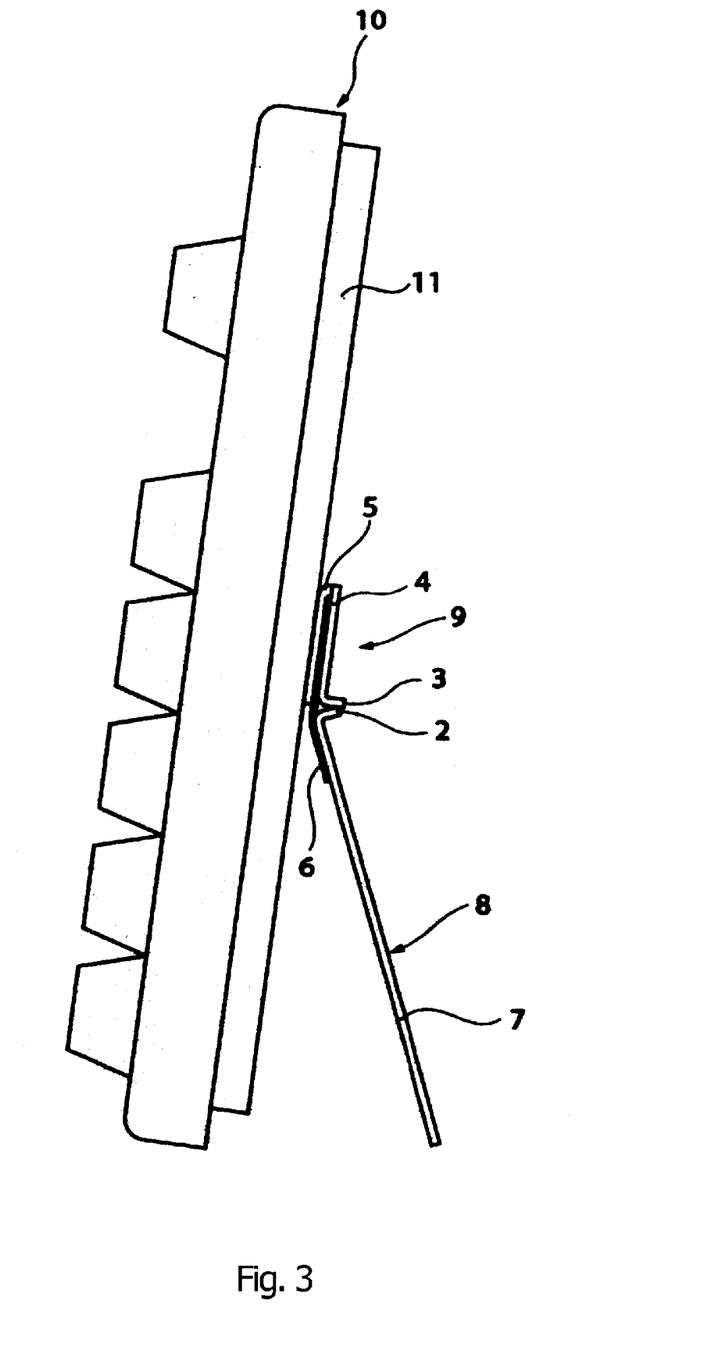
FIG. 3 illustrates a keyboard equipped with the self-standing keyboard support of this invention.

The thin resilient strip 6 placed across the undersides of edge portions 3 and 2 joins the flat band portion 4 to flat band portion 7. The thin resilient strip should be long enough to join the flat band portion 4 to flat band portion 7; in FIG. 1, one end of the thin resilient strip reaches up to the center of the flat band portion 4, but it may reach all the way to the end of the flat band portion 4. An adhesive portion 5 may be provided on the thin resilient strip 6. This used to mount the self-standing support 1 on a keyboard 10. The adhesive portion 6 should be within a dimensional range nearly enough to completely cover the flat band portion 4. The way the self-standing support 1 is mounted on keyboard 10 is illustrated in FIG. 3.

The flat band portion 7, the flat band portion 4, edge portion 2, edge portion 3 all have about the same dimensional width and sheet thicknesses, but the flat band portion 7 is preferred to be longer than the flat band portion 4. The flat band portion 7 is made longer over the flat band portion 4 in view of assuring the self-standing stability of the keyboard.

The band portion 7 should be aimed at 2.5–4.5 times as long as the length of the flat band portion 4.

Figure 2:
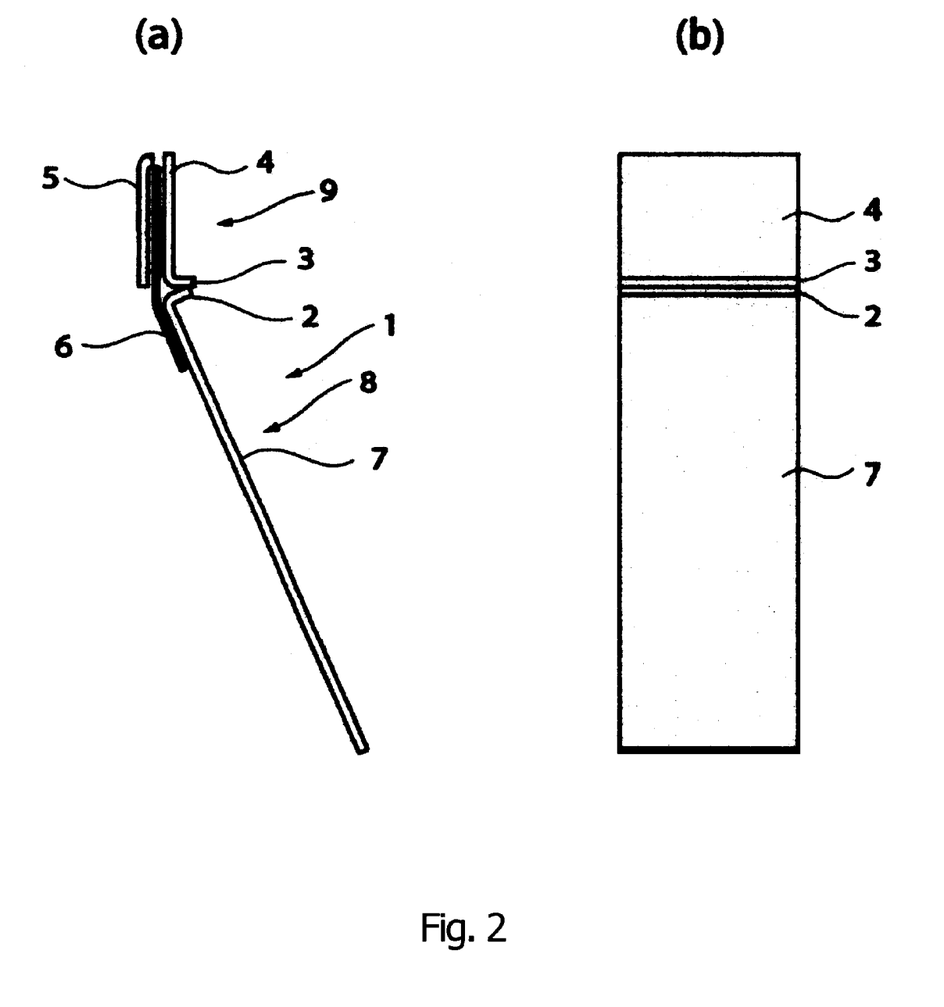

The edge portion 2 and edge portion 3 are set up at a certain distance apart. This is designed, as illustrated in FIG. 3, when the self-standing support is mounted on Keyboard 10, to cause the flat band portion 7 to open to a certain angle with respect to the keyboard for making the keyboard self standing. FIG. 2 illustrates the way the flat band portion 7 is open to a certain angle with respect to flat band portion 4. The flat band portion 7 is opened, inwardly toward the edge portions 2 and 3, at a certain angle with respect to the flat band portion 4, with the end of the edge portion 2 bent at a right angle acting as a fulcrum. In this case, the end of the edge portion 2 hits the exterior face of edge portion 3, which acts as a stopper to reach an angle beyond which no further opening can be made.

Figure 4:
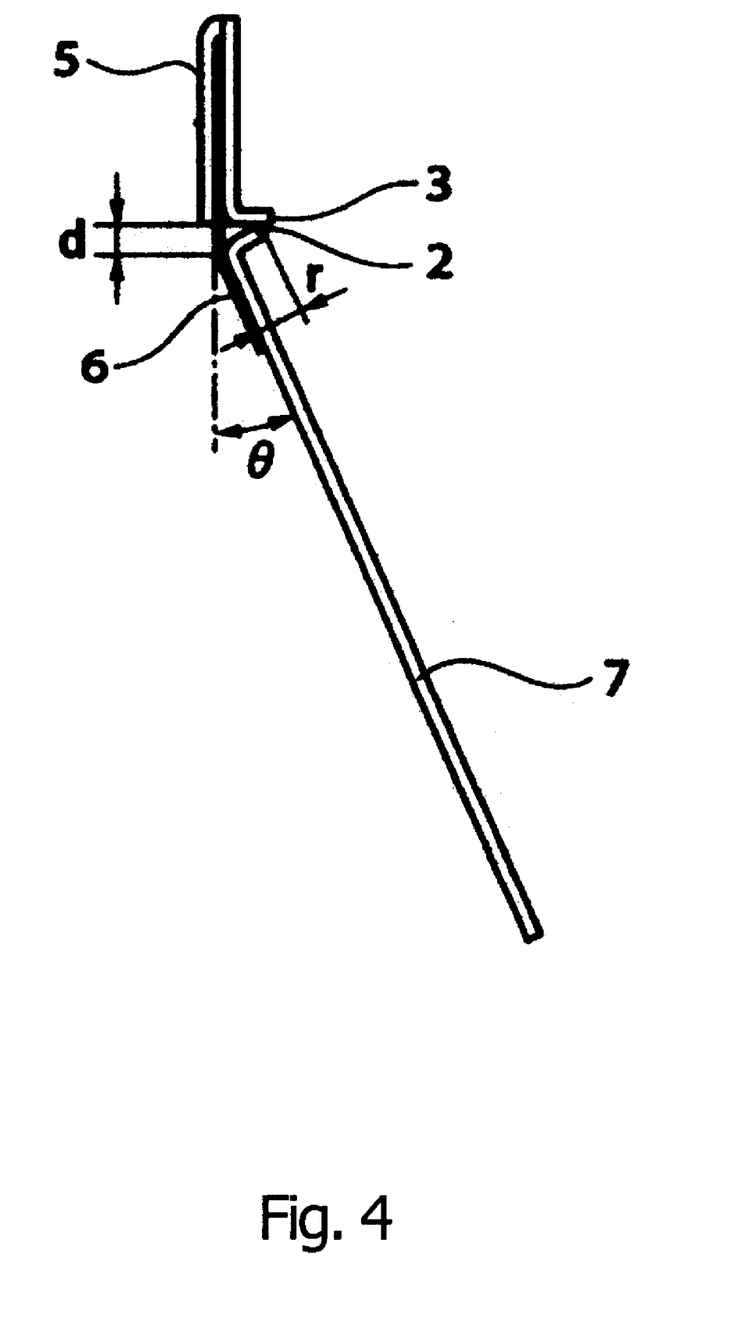
FIG. 4 illustrates a dimensional relationship where the flat band portion is open.

In order for the end of the edge portion 2 to come in contact with the exterior face of the edge portion 3 when the flat band portion 7 is opened, thereby acting as a stopper, the edge portion 2 should be made shorter in length than the edge portion 3. The angle at which the flat band portion 7 opens is determined approximately by the length of the edge portion 2 and the space between the edge portion 2 and edge portion 3. FIG. 4 shows that there is the relationship of Equation 1, where $\theta$ is an angle the flat band portion 7 makes to the vertical line, r is a length of edge portion 2, and d is the distance between the edge portions 2 and 3.

$$d = r \sin \theta \quad (1)$$

In order for the keyboard 10 to be made self-standing in a stable manner, the angle of the flat band portion 7 opened with respect to the flat band portion 4 should be suitably selected. With the angle $\theta$ in FIG. 4 as a guide, an angle between 10° and 40° should be selected. In other words, the distance d between the edge portion 2 and edge portion 3 should be 0.17–0.65 times the length of edge portion 2. The angle to which the flat band portion 7 is opened is suitably determined by taking into consideration the self standing stability of the keyboard 10 and condition of the work desk on which the personal computer is placed, on the basis of which one should suitably select the length of the edge portion 2 and the distance between edge portion 2 and edge portion 3.

The keyboard is laid down horizontally when the self-standing keyboard is to be used. In this case, the flat band portion 7 returns to the original position by virtue of the resiliency of the thin resilient strip 6, i.e., back to the state where the flat band portion 4 and flat band portion 7 are closed. The flat band portion 7 can be freely opened or closed through the function of the thin resilient strip 6.

The self-standing support 1 used in this invention may be made of metal plastic, or ceramic. A metal support is preferred in terms of resistance to breakage in handling, particularly for resiliency retention of the thin resilient strip.

If made of metal, the thin resilient strip 6 should be welded to the L-shaped band 8 and likewise to 9. If made of plastic or other material it should be joined together with an adhesive or the like. The thin resilient strip 6 should be made of a strip material used for springs. The adhesive portion 5 is suitably provided using a double-side adhesive type. One adhesive side is used for an adhesion to the support and the other adhesive side for adhesion to the keyboard. As the adhesion effect of the adhesive declines, the adhesion portion should be replaced with a fresh adhesive. It is obviously permissible not to provide an adhesive portion 5 but to directly apply adhesive to the exterior side of the thin resilient strip 6 on the back of the flat band portion 4 for adhesion to the keyboard back surface portion 11.

FIG. 3 illustrates a keyboard 10 equipped with said self-standing support. The self-standing support 1 is joined to the keyboard backside portion 11 via the adhesive portion 5. The self-standing support 1 is mounted on a position suitable for the keyboard 10 to be made self-standing. For the keyboard to be self-standing, the self-standing support 1 assumes an open state, as illustrated in FIG. 3, at a certain angle between the flat band portion 7, which constitutes the self-standing support 1, and the keyboard backside surface potion 11. As explained above, the end of edge portion 2 comes in contact with the exterior face of the edge portion 3 to hold the flat band portion 7 at a constant angle to the keyboard 10.

The keyboard 10 as equipped with this self-standing support 1 can be made self-standing or laid horizontally. The self-standing support 1, which is joined via a thin resilient strip 6, returns straight when the keyboard 10 is laid horizontally due to the function of the thin resilient strip, thereby causing no problem in laying down the keyboard 10 horizontally. For the keyboard 10 to be made self-standing, all one needs to do is to open the angle of the flat band portion 7 of the self-standing support 1, whereupon the keyboard is made self-standing.

Figure 5:
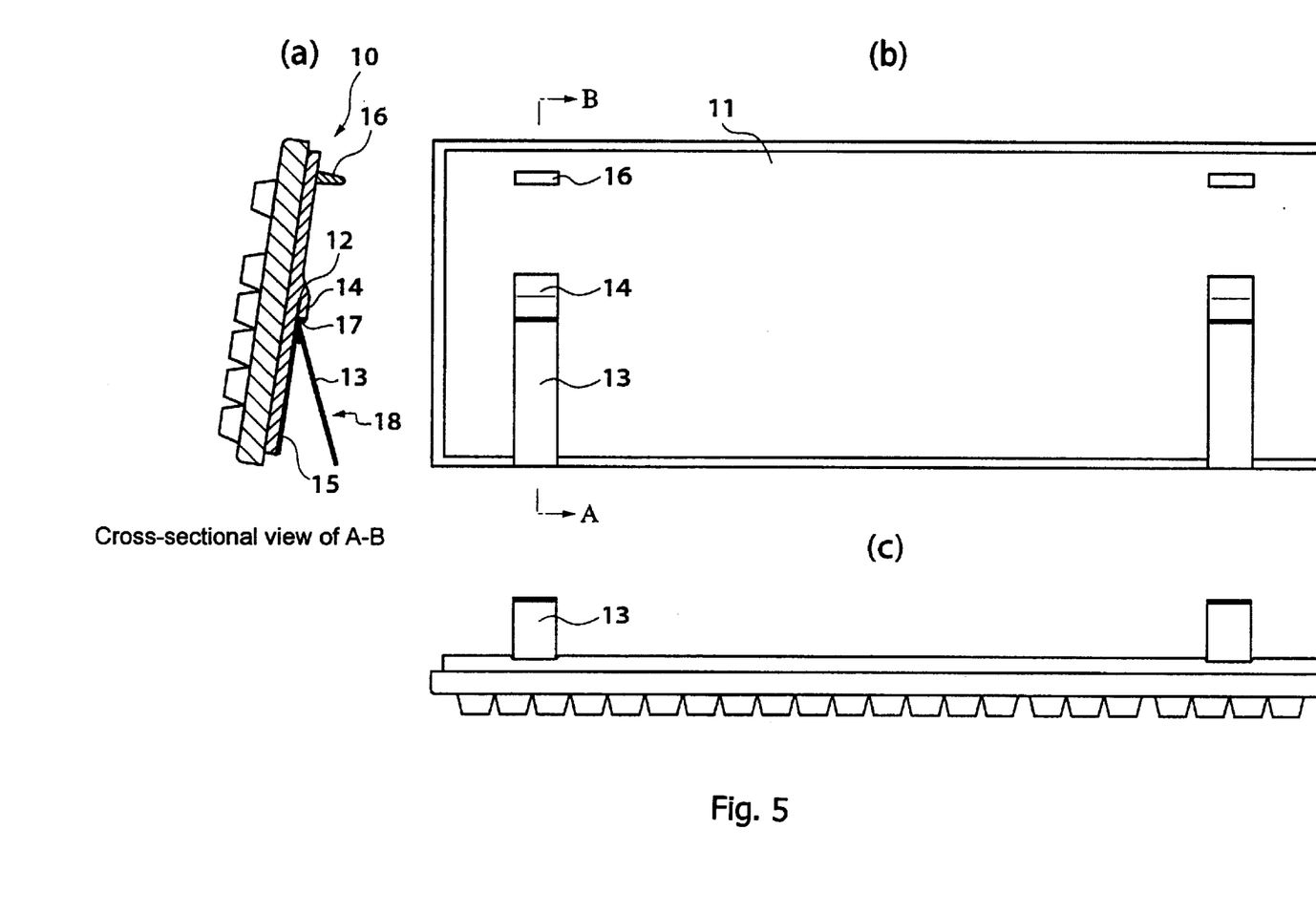
Figure 6:
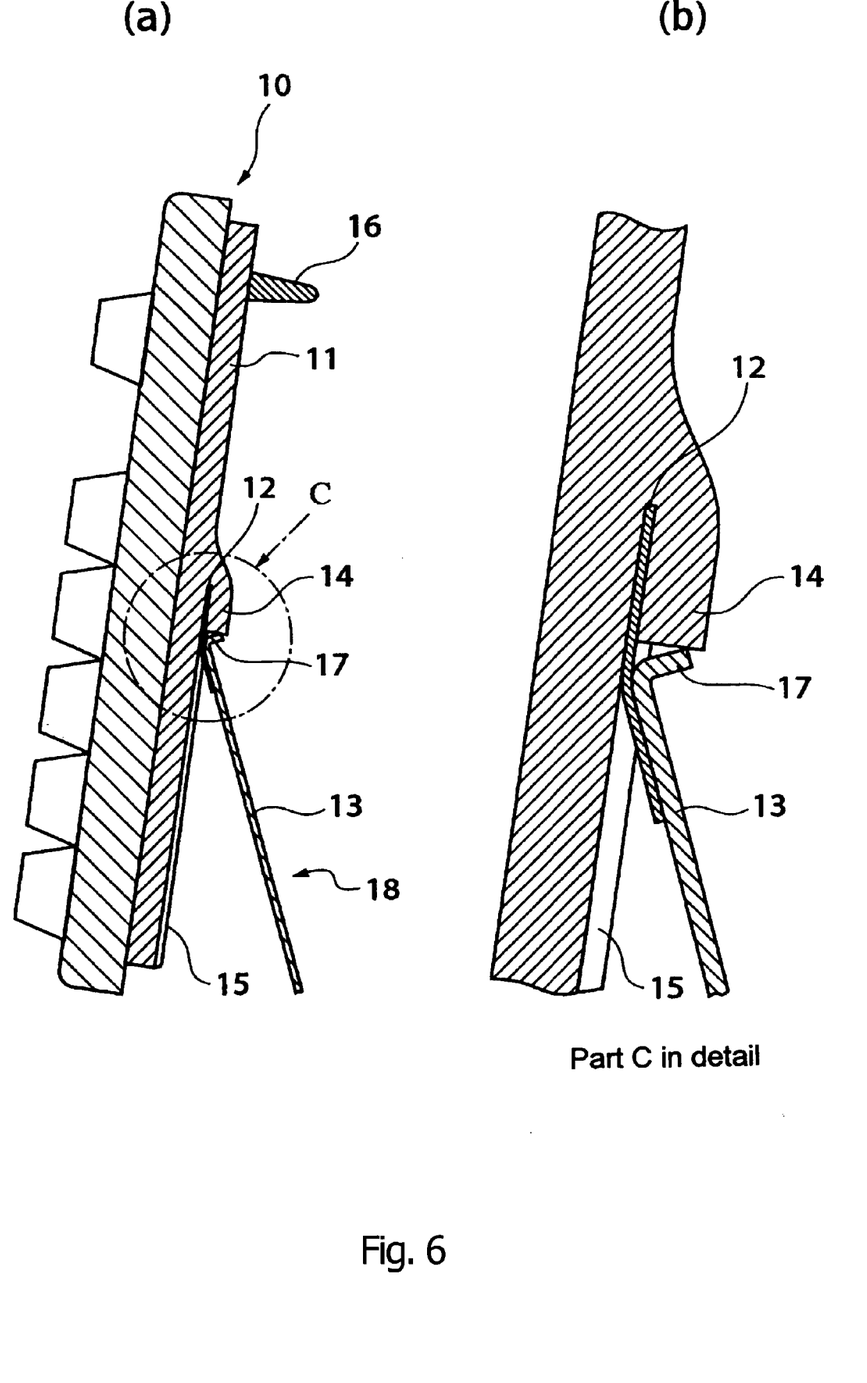

FIG. 5 illustrates a keyboard equipped with another self-standing support. FIG. 5(a) is a side view and FIG. 5(b) is a rear side view of the keyboard. The figures illustrate a keyboard equipped with a self-standing support with an arrangement where an L-shaped band (18) consisting of a flat band portion (13) and an edge portion (17) formed at one end thereof, at an approximately right angle to the flat band portion (13) is joined to one side of a thin resilient strip (12) while the other side of said thin resilient strip (12) is secured by being embedded into the keyboard backside portion (11) as shown in FIG. 6. The keyboard backside portion is provided with a protruding portion (14); and the end face of said protruding portion (14) and said edge portion (17) are arranged to face each other with a designated distance apart therebetween.

A thin resilient strip 12 has one side thereof embedded beneath the protruding portion 14 with the other side joined to the L-shaped band 18. This support can be molded in one piece when the keyboard is molded. If the thin resilient strip 12 and the L-shaped band 18 are made of metal they should be joined by welding. If it is made of plastic, it should be joined with an adhesive.

The end face of the protruding portion 14 and edge portion 17 are set up with a designated distance apart. This is designed to open the flat band portion 13 as illustrated in FIG. 6(a) at a certain angle to the keyboard 10. This condition is enlarged as shown in FIG. 6(b). The flat band portion 13 is opened at a certain angle with respect to the edge face of the protruding portion 14, with the part of edge portion 17 bent at a right angle acting as a fulcrum. In this case, the edge portion 17 hits the end surface of the protruding portion 14, which acts as a stopper to reach an angle beyond which no further opening can be made.

The angle at which the flat band portion 13 opens is determined approximately by the space between the end face of the protruding portion 14 and edge portion 17. In FIG. 6(b), there is a relationship of Equation 1, where $\theta$ is an angle of the flat band portion 13 to the keyboard, r is an exterior length of the edge portion 17, and d is the distance between the end face of the protruding portion 14 and the edge portion 17.

In order for the keyboard 10 to be self-standing and stabilized, the angle $\theta$ should be between 10° and 40°. In other words, the distance d between the protruding portion 14 and the edge portion 17 should be 0.17–0.65 times the exterior length of edge portion 17.

Figure 7:
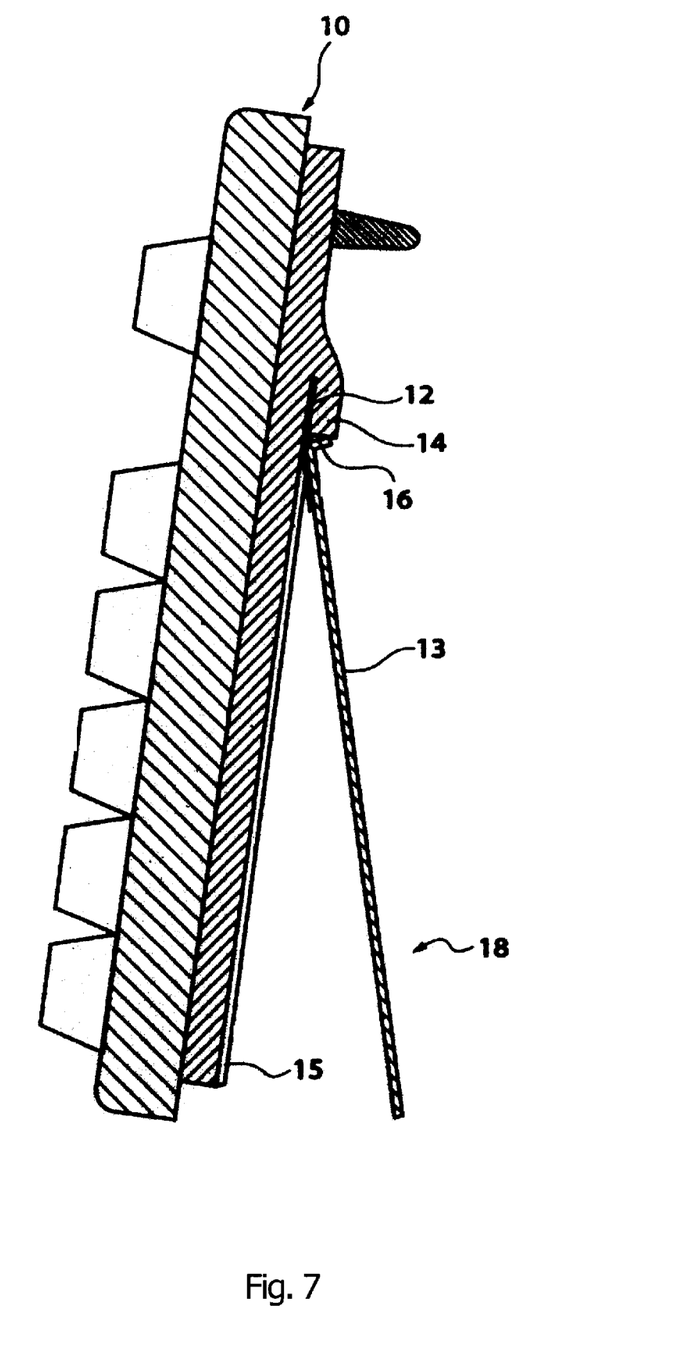
FIG. 7 illustrates another example of a keyboard equipped with a self standing support.

The indented portion 15 is arranged on the underside of the protruding portion 14 (see FIGS. 5~7), is as long as the sum of the length of the flat band portion 13 and the distance between the flat band portion 13 and the end face of said protruding portion 14, and is approximately as wide as the flat band portion 13. Further, the sum of the depth of said indented portion 15 and the height of said protruding portion is approximately equal to the sum of the heights of the edge portion 17 and the flat band portion 13 and the thickness of the thin resilient strip 12. When the keyboard 10 is laid horizontally, the L-shaped band 18, which consists of the flat band portion 13 and an edge portion 17 formed at one end thereof and at an approximately right angle to the flat band portion 13, can be stored in said indented portion 15. The function of the thin resilient strip 12 permits the L-shaped band 18 to be freely placed in and taken out or stored in said indented portion 15.

FIG. 5 shows that the length of the flat band portion 13 reaching up to the center of the length of keyboard 10, but it can be made longer. An example of lengthening the flat band portion 13 is given in FIG. 7. This length can be suitably selected, depending upon the way the keyboard is placed.

The keyboard equipped with the self-standing support of this invention provides excellent effects:

(1) The keyboard can be held upright when it gets in the way on the desk and the space saved thereby can be effectively utilized. (2) The keyboard can be used in the usual manner. (3) The self-standing support can be readily attached to the space beneath the keyboard, which usually does not interfere. (4) The keyboard equipped with the self-standing support does not require attaching anew a self-standing support.

In addition, (1) the self-standing support of this invention can be mounted over a very thin space on the bottom of a keyboard. (2) It has a simple structure and high stiffness. (3) It accommodates a variety of mounting methods, enabling a large area sheet to be mounted if the mounting strength is enhanced. (4) It permits using a variety of material for its fabrication although the support is commonly made of stainless steel sheet.

FEATURES OF THE INVENTION

As explained above, it is easy to mount the self-standing keyboard support of this invention. The keyboard equipped with the self-standing support can be left self-standing, with the benefit of active use of space on a confined desk on which the personal computer is placed. The keyboard has features in that while equipped with said self-standing support, it can be left self-standing or can be laid horizontally, a customary use condition. The keyboard can be easily operated without problems with said self-standing support remaining attached thereto. The keyboard equipped with the self-standing support can be made self-standing by an operation as simple as that of flipping the keyboard legs.

What is claimed is:

1. A self-standing keyboard support comprising a first L-shaped band and a second L-shaped band, said first L-shaped band having a flat band portion and an edge portion that extends from one end thereof at an approximately right angle to one side of said flat band portion of said first L-shaped band and said second L-shaped band having a flat band portion and an edge portion that extends from one end thereof at an approximately right angle to one side of said flat band portion of said second L-shaped band, said first and second L-shaped bands being arranged in such a way that an outer side of the edge portion of the first L-shaped band faces an outer side of the edge portion of the second L-shaped band with a designated distance apart therebetween, said flat band portion of the first L-shaped band and the flat band portion of the second L-shaped band being joined together by a thin resilient strip placed across sides thereof opposite from said one sides thereof and underneath the edge portions.

2. The self-standing keyboard support as set forth in claim 1 wherein the flat band portion of the second L-shaped band is longer than the flat band portion of the first L-shaped band.

3. The self-standing keyboard support as set forth in claim 2 wherein the flat band portion of the second L-shaped band is 2.5–4.5 times as long as the flat band portion of the first L-shaped band.

4. The self-standing keyboard support as set forth in claim 1 wherein said opposite side of the flat band portion of the first L-shaped band is further provided with an adhesive portion.

5. The self-standing keyboard support as set forth in claim 1 wherein the length of the edge portion of the second L-shaped band is shorter than that of the length of the edge portion of the first L-shaped band.

6. The self-standing keyboard support as set forth in claim 5 wherein the space between the outer sides of the edge portions is 0.17–0.65 times the outer side length of the edge portion of the second L-shaped band.

7. A keyboard equipped with a self-standing keyboard support as set forth in any one of claims 1, 2, 4, or 5.

8. The self-standing keyboard support as set forth in claim 1 wherein the angles between the flat band portion and the edge portion of the first L-shaped band, and between the flat band portion and the edge portion of the second L-shaped band are right angles.

* * * * *